United States Patent [19]

Kimura et al.

[11] 4,302,197
[45] Nov. 24, 1981

[54] TOOTHED BELT

[75] Inventors: Kazuo Kimura; Tooru Fujiwara; Norio Harada, all of Osaka, Japan

[73] Assignee: Tsubakimoto Chain Co., Osaka, Japan

[21] Appl. No.: 69,434

[22] Filed: Aug. 24, 1979

[30] Foreign Application Priority Data

Sep. 13, 1978 [JP] Japan ............................ 53/111667
Dec. 13, 1978 [JP] Japan ............................ 53/153058

[51] Int. Cl.³ ............................................ F16G 1/10
[52] U.S. Cl. ............................... 474/267; 139/420 R; 198/847
[58] Field of Search ............ 474/266, 267, 268; 139/420 R, 420 A, 426 R; 198/844, 847

[56] References Cited

U.S. PATENT DOCUMENTS

| 2,862,283 | 12/1958 | Rasero | 139/420 A |
| 3,019,821 | 2/1962 | White | 139/420 A |
| 3,296,062 | 1/1967 | Truslow | 198/844 |
| 3,446,252 | 2/1969 | Maxham | 139/420 R |
| 4,169,393 | 10/1979 | Wetzel et al. | 474/268 X |

Primary Examiner—C. J. Husar
Assistant Examiner—Conrad Berman
Attorney, Agent, or Firm—Blanchard, Flynn, Thiel, Boutell & Tanis

[57] ABSTRACT

A toothed belt having an endless rubber band formed with projecting tooth portions, the rubber band having tension members buried in parallel therein. A cloth cover is fastened to the toothed surface of the band. The cloth is formed of woven fibers, and one of the warp and woof fibers of the cloth has a high-adhesive characteristic, and has a greater exposed surface area on one side of the cloth, which side is fastened to the toothed surface. The other of the warp and woof is formed of a fiber having properties suited for the working environment, such as properties of abrasion resistance and low friction, these latter fibers having a greater exposed area on the other side of the cloth, which other side is positioned for engagement with a toothed pulley.

2 Claims, 7 Drawing Figures

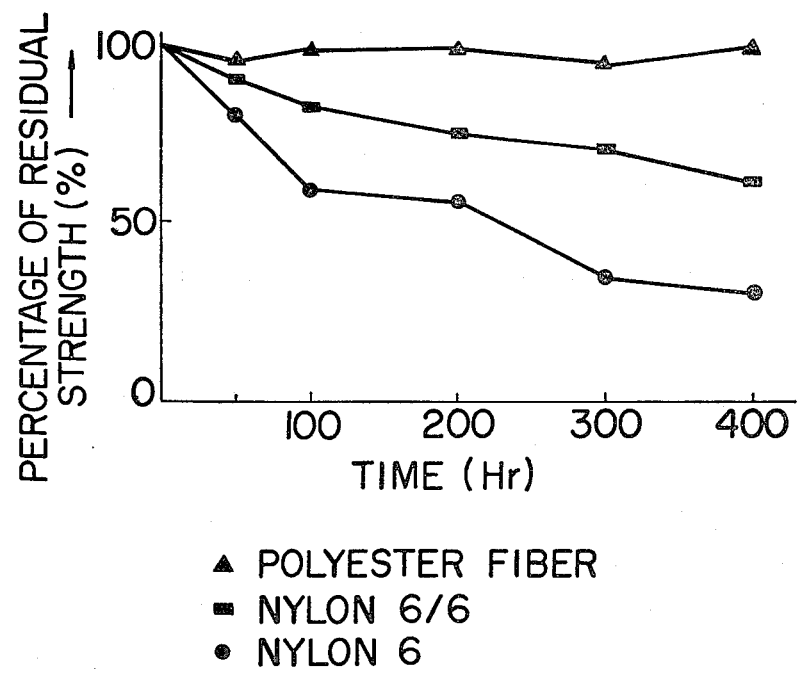

TOOTHED BELT

FIELD OF THE INVENTION

This invention relates to a toothed belt passed over separately disposed toothed pulleys to transmit motion and power and, more particularly, to an improved cover cloth stuck to the surface of a tooth portion of the belt.

BACKGROUND OF THE INVENTION

As is known, a cover cloth stuck to a toothed belt prevents cracking of the rubber portion of the belt, protects the rubber portion, and imparts adequate strength to the tooth portion of the belt to retain its shape on engaging with a toothed pulley. Therefore, the cover cloth should adhere well to the rubber portion, and have such adaptability and durability to withstand for a long time the environment in which power transmission is conducted.

However, adhesiveness and adaptability to the environment often conflict with each other. When engaging with the toothed pulley, the surface of the tooth portion wears off. Desirably, therefore, the cover cloth stuck to the tooth surface should have abrasion resistance. Some commonly used fibers, such as nylon 6, adhere well to rubber, but have high friction coefficients. When engaging with the toothed pulley, a cover cloth with a high friction coefficient liberates heat which impairs the durability of both the rubber portion and the cover cloth.

Fluorine-based fibers have low friction coefficients, but do not adhere well to rubber. Consequently, a cover cloth of this type may come off from the tooth surface while power is being transmitted.

This invention provides a toothed belt which is free from the above-described shortcomings.

An embodiment of this invention will be described with reference to the accompanying drawings.

BRIEF DESCRIPTION OF THE DRAWINGS

FIG. 7 is a graphical representation of the thermal deterioration of several woven fabrics with time in an atmosphere at 120° C.

DETAILED DESCRIPTION

Figure 1:
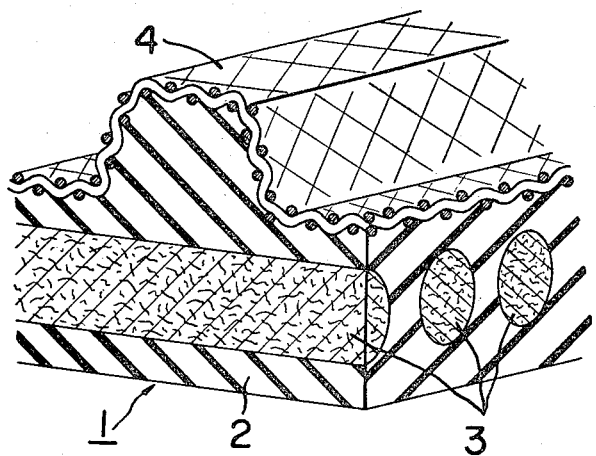
FIG. 1 is a fragmentary cross-sectional perspective view of a conventional timing belt.
Figure 2:
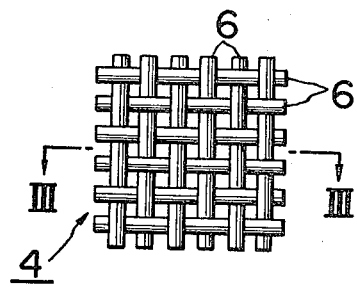
FIG. 2 is a plan view enlarging the principal part of a conventional cover cloth.
Figure 3:
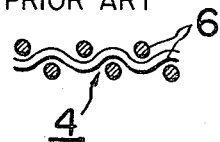
FIG. 3 is a cross-sectional view taken along the line III—III in FIG. 2.

FIG. 1 is a cross-sectional perspective view of a conventional endless toothed belt. The toothed belt 1 comprises an endless rubber portion 2 in which a plurality of endless tension members 3 are buried in parallel, with a cover cloth 4 stuck to the outer toothed surface of the rubber portion. Interlaced alternately as shown in FIGS. 2 and 3, the warp and woof fibers of the cover cloth 4 form the same pattern on the top and bottom sides thereof. With this makeup, the friction coefficient of the cover cloth drops when its adhesiveness is increased, and vice versa.

Figure 4:
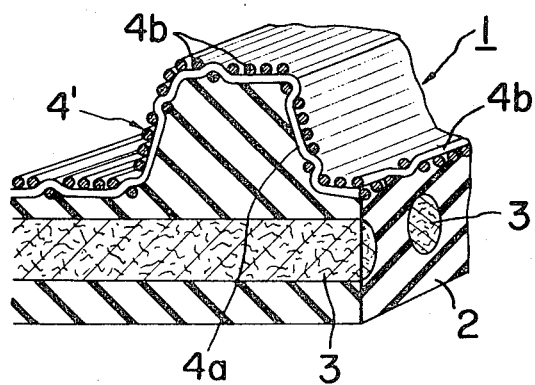
FIG. 4 is a fragmentary cross-sectional perspective view of a timing belt according to this invention.
Figure 5:
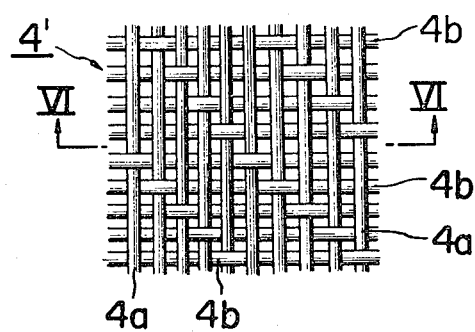
FIG. 5 is a plan view enlarging the principal part of the rear side of the cover cloth in FIG. 4.
Figure 6:
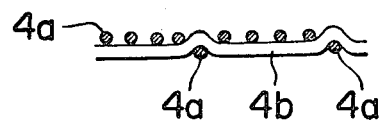
FIG. 6 is a cross-sectional view taken along the line VI—VI of FIG. 5.

In the improved belt of this invention, the belt includes a conventional toothed rubber portion, but the warp and woof fibers of the cover cloth 4' according to this invention are interlaced differently as shown in FIGS. 4 to 6.

In FIG. 4, the warp fiber 4a of the cover cloth 4' consists of a fiber such as nylon 6 or 6/6 that is highly adhesive to the rubber portion 2. The woof fiber 4b consists of a fiber suited for the condition of the engaging member; e.g., fluorine- and carbon-based fibers having high abrasion resistance and low friction coefficient or such heat-resisting fibers as of the polyester, aromatic polyamide, polysulfite, polyimide, polysulfone and polyamide imide groups. As shown in FIGS. 5 and 6, the warp fiber 4a and the woof fiber 4b are so interlaced that the highly adhesive fibers 4a have greater surface area on the side that is stuck to the tooth portion of the toothed belt rubber portion 2, and the fibers 4b, having abrasion-, heat- corrosion- resistance or other properties demanded by the conditions and atmosphere on the engaging side, have greater surface area on the side of the belt that engages with the toothed pulley. In FIGS. 5 and 6, the warp 4a and 4b are fibers are interlaced at a 1:4 ratio.

Consequently, the warp fibers 4a, highly adhesive to the rubber portion 2, appears more on the bottom or inner side of the cover cloth 4', and the woof fiber 4b, having abrasion-, heat-, corrosion-resistance or other properties demanded by the conditions and atmosphere on the engaging side, appears more on the top or outer side. By fastening the bottom side of the cover cloth 4' to the rubber portion 2 and exposing the top side to the engaging side atmosphere, the shortcomings of the conventional cover cloths have been eliminated without impairing their advantages.

A toothed belt according to this invention, therefore, has the surface of the tooth portion thereof covered with such a cover cloth as adheres well to the rubber portion of the belt and meets the working environmental requirements.

For example, the tooth portion surface of a conventional timing belt for driving the cam shaft of an automobile is covered with a cover cloth that is made of the warp and woof of nylon 6 or 6/6. Considering the heat transmitted from the engine and liberated by the friction of the belt, the cover cloth should be capable of withstanding a temperature of approximately 120° C. As shown in FIG. 7, however, nylon 6 (marked with ⊙) and nylon 6/6 (marked with −) cannot retain adequate strength because of thermal deterioration that advances with time. By contrast, polyester fiber (marked with ▲) exhibits no thermal deterioration.

FIG. 7 plots timewise changes in percent residual strength, resulting from the thermal deterioration in an atmosphere at 120° C., of cover cloths of nylon 6, nylon 6/6 and polyester. The x-axis represents time, and the y-axis the percentage of residual strength of the individual fibers with respect to their strength at ordinary temperatures. This graph indicates the following:

(1) The cover cloths of nylon 6 (⊙) and nylon 6/6 (−) show signs of thermal deterioration in 50 hours, and their residual strengths drop to 30 and 60 percent, respectively, in 400 hours.

(2) The polyester cover cloth (▲) scarcely undergoes thermal deterioration despite the lapse of time.

Obviously, the polyester cover cloth can retain strength comparable to that at ordinary temperatures, while the nylon cover cloths cannot, in a high-temperature atmosphere of 120° C.

However, polyester does not adhere well to rubber. Before fastening the polyester cover cloth to the tooth surface of the belt, therefore, two pretreatments should be given; epoxy and RFL treatments. The polyester cover cloth cannot be fastened to the tooth surface without such complex, troublesome procedures. Though less resistant to heat, the nylon cover cloth adheres well to the tooth surface, requiring only RFL treatment. The low adhesiveness of heat-resisting polyester calls for a double treatment, whereas a single treatment is enough for nylon that is less heat-resistant but more adhesive.

The cover cloth according to this invention has more polyester fibers exposed on the top outer side to increase the resistivity to the high-temperature working environment, and more nylon fibers on the bottom inner side to increase the adhesiveness to the rubber tooth surface. Therefore, it adheres as fast to the tooth surface as the conventional nylon cover cloth, requiring only RFL treatment. At the same time, it does not suffer from thermal deterioration even when used in a high-temperature atmosphere.

Similar excellent results can be obtained even when the polyester and other fibers in the above-described embodiment is replaced with fluorine- or carbon-based abrasion-resistant fibers or corrosion-resistant fibers.

Understandably, an embodiment wherein the warp 4a and woof 4b of the above-described embodiment are used as the woof and warp, respectively, also comes within the scope of this invention.

In the cover cloth of this invention, as described above, either of the warp and woof consists of high-adhesive fibers, which is exposed more on the side to be fastened to the rubber tooth surface of the belt. The other consists of such fibers as have abrasion-, heat-, corrosion-resistance or other properties suited for the working environment, which is exposed more on the side that engages with the toothed pulley. As a consequence, the toothed belt according to this invention brings about much better results than the conventional ones, adhering fast to the tooth surface with a single pretreatment and having adequate durability against the surrounding atmosphere.

As shown by FIG. 4, the high-adhesive fibers 4a which define the majority of the inner side of the cloth are preferably disposed so that they extend in the lengthwise or longitudinal direction of the belt since these fibers become securely adhered to the endless rubber portion 2 and hence strengthen and reinforce it.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In an endless toothed power-transmitting belt having an endless rubber base portion with tension members buried in parallel therein, a plurality of rubber teeth integrally fixed to the base portion and projecting sidewardly therefrom in spaced relationship along the belt, and a cover cloth fastened to and overlying an exposed surface of the belt including the projecting tooth portions, comprising the improvement wherein the cover cloth consists of two fiber layers defined by warp and woof fibers which extend in transverse relationship and are interwoven with one another, one of said warp and woof fibers consisting of a first fiber which is highly adhesive, and the other of the warp and woof fibers consisting of a second fiber which has a low friction property and is resistant to abrasion, high temperature or corrosion so as to withstand the working environment to which the belt is exposed, said first and second fibers being interwoven so that one side surface of said cover cloth has most of its exposed surface defined by said first fiber, and whereas the other side surface of said cover cloth has most of its exposed surface defined by said second fiber, said cover cloth being positioned on and fixed to the belt such that said one side surface directly contacts and is adhesively joined to the exposed surface of the base and tooth portions, said other side surface of said cover cloth defining the exterior surface of the belt for contact with a driving or driven element.

2. A belt according to claim 1, wherein said first fiber extends substantially in the longitudinal direction of the belt.

* * * * *